(12) United States Patent  
Abramov et al.

(10) Patent No.: US 9,919,381 B2  
(45) Date of Patent: Mar. 20, 2018

(54) APPARATUS AND METHODS FOR CONTINUOUS LASER CUTTING OF FLEXIBLE GLASS

(71) Applicant: Corning Incorporated, Corning, NY (US)

(72) Inventors: Anatoli Anatolyevich Abramov, Painted Post, NY (US); Chester Hann Huei Chang, Painted Post, NY (US); Todd Benson Fleming, Elkland, PA (US); Eric Lee Miller, Corning, NY (US); Ian David Tracy, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/763,614

(22) PCT Filed: Jan. 28, 2014

(86) PCT No.: PCT/US2014/013260  
§ 371 (c)(1),  
(2) Date: Jul. 27, 2015

(87) PCT Pub. No.: WO2014/120626  
PCT Pub. Date: Aug. 7, 2014

(65) Prior Publication Data  
US 2015/0367444 A1 Dec. 24, 2015

Related U.S. Application Data

(60) Provisional application No. 61/758,379, filed on Jan. 30, 2013.

(51) Int. Cl.  
*C03B 33/10* (2006.01)  
*B23K 26/00* (2014.01)  
(Continued)

(52) U.S. Cl.  
CPC ...... *B23K 26/0087* (2013.01); *B23K 26/0846* (2013.01); *B23K 26/14* (2013.01);  
(Continued)

(58) Field of Classification Search  
CPC ............ C03B 33/0235; C03B 33/0222; C03B 33/102; C03B 33/091  
See application file for complete search history.

(56) References Cited

U.S. PATENT DOCUMENTS

| 4,467,168 A | 8/1984 | Morgan et al. |
| 5,826,772 A | 10/1998 | Ariglio et al. |

(Continued)

FOREIGN PATENT DOCUMENTS

| JP | 2009-078502 | 4/2009 |
| JP | 2009078502 A | * 4/2009 |

(Continued)

OTHER PUBLICATIONS

Machine translation for JP 2009078502, Dividing Apparatus and Dividing Method of Brittle Material Substrate, Morita, Apr. 16, 2009.*

(Continued)

*Primary Examiner* — Queenie S Dehghan  
(74) *Attorney, Agent, or Firm* — Jeffrey A. Schmidt

(57) ABSTRACT

A method for cutting a flexible glass ribbon includes directing the flexible glass ribbon to a flexible glass cutting apparatus including a laser. The flexible glass ribbon includes a first broad surface and a second broad surface that extend between a first edge and a second edge of the flexible glass ribbon. A laser beam is directed from the laser onto a region of the flexible glass ribbon. A crack is formed through the flexible glass ribbon using the laser beam. The crack is (Continued)

propagated along the flexible glass ribbon using the laser beam and a local mechanical deformation in the flexible glass ribbon.

18 Claims, 7 Drawing Sheets

(51) Int. Cl.
    *B23K 37/02*     (2006.01)
    *B23K 37/04*     (2006.01)
    *B23K 26/08*     (2014.01)
    *B23K 26/14*     (2014.01)
    *B23K 26/38*     (2014.01)
    *B23K 26/40*     (2014.01)
    *C03B 33/023*     (2006.01)
    *C03B 33/09*     (2006.01)
    *B23K 101/16*     (2006.01)
    *B23K 103/00*     (2006.01)

(52) U.S. Cl.
    CPC .......... *B23K 26/1462* (2015.10); *B23K 26/38* (2013.01); *B23K 26/40* (2013.01); *B23K 37/0235* (2013.01); *B23K 37/0408* (2013.01); *C03B 33/0235* (2013.01); *C03B 33/091* (2013.01); *B23K 2201/16* (2013.01); *B23K 2203/50* (2015.10)

(56) References Cited

U.S. PATENT DOCUMENTS

| | | |
|---|---|---|
| 6,252,197 B1 | 6/2001 | Hoekstra et al. |
| 6,327,875 B1 | 12/2001 | Allaire et al. |
| 6,502,423 B1 | 1/2003 | Ostendarp et al. |
| 8,171,753 B2 | 5/2012 | Abramov et al. |
| 8,312,741 B2 | 11/2012 | Teranishi et al. |
| 8,895,892 B2 | 11/2014 | Garner et al. |
| 8,935,042 B2 | 1/2015 | Taylor et al. |
| 9,149,889 B2 | 10/2015 | Boettcher et al. |
| 9,790,121 B2 | 10/2017 | Abramov et al. |
| 2007/0169849 A1 | 7/2007 | Yahagi et al. |
| 2007/0275338 A1 | 11/2007 | Acker et al. |
| 2009/0050661 A1* | 2/2009 | Na ..................... B26F 3/002 225/2 |
| 2011/0049764 A1 | 3/2011 | Lee et al. |
| 2012/0017642 A1* | 1/2012 | Teranishi ............ B28D 5/0011 65/105 |
| 2012/0125967 A1 | 5/2012 | Furuta et al. |
| 2012/0131962 A1 | 5/2012 | Mitsugi et al. |
| 2013/0126576 A1* | 5/2013 | Marshall ............... C03B 33/033 225/2 |
| 2014/0130649 A1* | 5/2014 | Chang .................. C03B 33/033 83/26 |

FOREIGN PATENT DOCUMENTS

| | | |
|---|---|---|
| JP | 2010100495 A | 5/2010 |
| JP | 2011-031555 | 2/2011 |
| JP | 2015140279 A | 8/2015 |
| WO | 2007142264 A1 | 12/2007 |
| WO | 2011162392 A1 | 12/2011 |

OTHER PUBLICATIONS

Extended European Search Report dated Sep. 16, 2016 in European Patent Application No. 14746268.3.

International Search Report and Written Opinion of the International Searching Authority, PCT/US2014/013260; dated May 14, 2015: 13 pages; Korean Patent Office.

English Translation of CN201480006574.6 Notice of First Office Action dated Aug. 22, 2016; 10 pages; Chinese Patent Office.

TW103103625 Search Report dated May 9, 2017, Taiwan Patent Office.

English Translation of JP2015555395 Office Action dated Oct. 17, 2017, Japan Patent Office, 7 pages.

* cited by examiner

APPARATUS AND METHODS FOR CONTINUOUS LASER CUTTING OF FLEXIBLE GLASS

This application claims the benefit of priority under 35 U.S.C.§ 119 of U.S. Provisional Application Ser. No. 61/758379 filed on Jan. 30, 2013 the content of which is relied upon and incorporated herein by reference in its entirety.

TECHNICAL FIELD

The present invention relates to apparatuses and methods for continuous laser cutting of flexible glass.

BACKGROUND

Glass sheets have been used in the manufacture of display devices such as liquid crystal display (LCD) TVs, computer monitors and handheld devices. For example, in a modern LCD TV set, a piece of thin glass sheet with pristine surface quality is used as a substrate for thin-film-transistor (TFT) and other electronic devices, and another piece is used as a substrate for the color filter. Recently, thin glass sheets started to find use as cover sheets for the screens of handheld devices and TV sets as well.

The thin glass sheets may be made by using a fusion down-draw process, a float forming process, or other forming methods, from glass melt. Because these forming processes are frequently continuous on an industrial scale, as-formed glass ribbons immediately exiting the forming facility often need to be cut into multiple, continuous strips and/or discreet glass sheets before being shipped to device manufacturers. The cut glass sheets produced at the glass forming production lines often have sizes that can accommodate the manufacture of multiple devices on the same surface simultaneously. At a certain point of time, such large glass sheets need to be cut into smaller size of the final devices.

SUMMARY

The present concept involves laser cutting of a flexible glass ribbon using mechanical deformation of the flexible glass ribbon to assist in propagating a flaw through the glass ribbon. The mechanical deformation may be in the form of a floating local depression or dimple that is formed by directing pressurized gas onto one or more surfaces of the flexible glass ribbon to impart a tensile stress profile used to sever the flexible glass ribbon. The mechanical deformation may be in addition to any deformation caused by the laser beam, itself, and may assist in stabilizing crack propagation.

Cutting a moving glass ribbon, or web, using a laser, for example a CO2 laser, typically involves three steps:

1. Creation of small initiation defect on the glass surface by, for example, a diamond impregnated wheel or stylus in front of the laser beam;
2. Heating the glass surface by the laser beam along the desired cutting direction; and
3. Cooling down the laser heated surface locally to cause tensile forces on the surface to propagate the crack or partial vent starting from the initiation defect.

The cooling step is normally done with water or air/water mixture focused on the glass surface that has been heated by the laser. Through experimentation the inventors discovered that if instead of using water jet or an air/water mix to cool the surface, a stream of compressed air alone was used to press the glass downward after it had been heated by the laser, then a more controlled crack propagation of the full depth cut ("full body cut") could be obtained. Sufficient air pressure creates a circular depression, or dimple, in the glass surface, that enables tensioning of the glass and propagation of the crack.

The depression improves the precision and consistency of the laser cutting process of glass by applying steady air pressure that puts glass surface into tension, predisposing the glass to break along the course of the laser beam. Elimination of water or air-water mist from the process significantly improves edge quality by reducing edge waviness, which is typical, when excessive amount of coolant is used, exceeding the minimum required to support crack propagation. Besides, an air stream creates predominantly symmetrical and uniaxial stress field through the glass thickness, which promotes crack propagation in the direction perpendicular to the glass surface, minimizing edge plane change and twist hackle. It provides advantage over "traditional" laser cutting methods by also minimizing variations of the crack propagation velocity by isolating the tip of the crack from vibrations of the glass originated from different sources (bead chopper, edge lamination, inconsistency of air-bearing glass web support, incoming web shape etc.), outside the cutting area (particularly downstream thereof), and, thus, enables overall robustness of the process and improved edge quality. This is particularly important when performing continuous laser cutting of thin, moving webs.

According to a first aspect, a method for cutting a flexible glass ribbon comprises:

directing the flexible glass ribbon to a flexible glass cutting apparatus including a laser, the flexible glass ribbon including a first broad surface and a second broad surface that extend between a first edge and a second edge of the flexible glass ribbon;

directing a laser beam from the laser onto a region of the flexible glass ribbon;

forming a crack through the flexible glass ribbon using the laser beam; and propagating the crack along the flexible glass ribbon using the laser beam and a local mechanical deformation in the flexible glass ribbon.

According to a second aspect, there is provided the method of aspect 1, further comprising forming an initiation defect in the flexible glass ribbon between the first and second edges.

According to a third aspect, there is provided the method of aspect 2, wherein the local mechanical deformation is formed in the flexible glass ribbon at the initiation defect.

According to a fourth aspect, there is provided the method of any one of aspects 1-3, wherein the local depression is formed by directing a pressurized gas onto the flexible glass ribbon.

According to a fifth aspect, there is provided the method of aspect 4, further comprising increasing pressure of the pressurized gas after forming the initiation defect in the flexible glass ribbon.

According to a sixth aspect, there is provided the method aspect 5, wherein the pressurized gas is air.

According to a seventh aspect, there is provided the method of any one of aspects 1-6, wherein the local depression is at least partially formed in the region where the laser beam is directed.

According to an eighth aspect, there is provided the method of any one of aspects 1-7, wherein the initiation defect is a continuous scribe line formed in the flexible glass ribbon.

According to a ninth aspect, there is provided the method of any one of aspects 1-8, wherein the local depression has a depth of between about 0.1 mm and about 1 mm According to an tenth aspect, there is provided the method of any one of aspects 1-9, wherein the local depression has a width of between about 3 mm and about 25 mm According to an eleventh aspect, a glass cutting apparatus for cutting a flexible glass ribbon comprises:

a defect initiation device arranged and configured to form an initiation defect in a flexible glass ribbon;

an optical delivery apparatus arranged and configured to direct a beam of radiation onto a flexible glass ribbon for heating a region of the flexible glass ribbon including an initiation defect formed using the defect initiation device; and a pressurized gas delivery device arranged and configured to form a local mechanical deformation in a flexible glass ribbon at an initiation defect formed using the defect initiation device using a pressurized gas.

According to a twelfth aspect, there is provided the apparatus of aspect 11, wherein the pressurized gas is air.

According to a thirteenth aspect, there is provided the apparatus of any one of aspect 11 or aspect 12, wherein the pressurized gas delivery device is arranged to form the local depression at least partially in the region where the beam of radiation is directed.

According to a fourteenth aspect, there is provided the apparatus of any one of aspects 11-13, wherein the beam of radiation is a laser beam.

According to a fifteenth aspect, there is provided the apparatus of any one of aspects 11-14, wherein the defect initiation device forms a continuous scribe line in a flexible glass ribbon.

According to a sixteenth aspect, there is provided the apparatus of any one of aspects 11-15, wherein the pressurized gas delivery device comprises a nozzle that provides a divergent gas flow.

According to a seventeenth aspect, a glass processing apparatus comprises:

a conveying path along which a flexible glass ribbon may be conveyed through the glass processing apparatus; and a glass cutting apparatus for cutting a flexible glass ribbon that may be conveyed along the conveying path, the glass cutting apparatus comprising:

a defect initiation device arranged and configured to form an initiation defect in a flexible glass ribbon conveyed along the conveying path;

an optical delivery apparatus arranged and configured to direct a beam of radiation onto a flexible glass ribbon conveyed along the conveying path for heating a region of the flexible glass ribbon including the initiation defect; and a pressurized gas delivery device arranged and configured to form a local depression in a flexible glass ribbon conveyed along the conveying path at the initiation defect using a pressurized gas.

According to an eighteenth aspect, there is provided the apparatus of aspect 17, wherein the pressurized gas is air.

According to a nineteenth aspect, there is provided the apparatus of aspect 17 or aspect 18, wherein the pressurized gas delivery device forms the local depression at least partially in the region where the beam of radiation is directed.

According to a twentieth aspect, there is provided the apparatus of any one of aspects 17-19, wherein the beam of radiation is a laser beam.

According to a twenty-first aspect, there is provided the apparatus of any one of aspects 17-20 wherein the defect initiation device forms a continuous scribe line in a flexible glass ribbon.

According to a twenty-second aspect, there is provided the apparatus of any one of aspects 17-21, wherein the pressurized gas delivery device comprises a nozzle that provides a divergent gas flow.

According to a twenty-third aspect, there is provided the apparatus of any one of aspects 1-22, wherein one or more discrete scribe lines are formed in the flexible glass ribbon using a defect initiation device.

Additional features and advantages will be set forth in the detailed description which follows, and in part will be readily apparent to those skilled in the art from the description or recognized by practicing the invention as exemplified in the written description and the appended drawings and as defined in the appended claims. It is to be understood that both the foregoing general description and the following detailed description are merely exemplary of the invention, and are intended to provide an overview or framework to understanding the nature and character of the invention as it is claimed.

The accompanying drawings are included to provide a further understanding of principles of the invention, and are incorporated in and constitute a part of this specification. The drawings illustrate one or more embodiment(s), and together with the description serve to explain, by way of example, principles and operation of the invention. It is to be understood that various features of the invention disclosed in this specification and in the drawings can be used in any and all combinations.

DETAILED DESCRIPTION

Embodiments described herein generally relate to processing of flexible glass ribbon and, more particularly, to cutting the flexible glass ribbon, for example, into multiple flexible glass ribbons and/or into discrete flexible glass sheets. As used herein, the term "ribbon" may refer to any length of flexible glass such as sheets or a web fed continuously, for example, from a roll or forming process. Separation of the flexible glass ribbon is achieved using a laser beam assisted by a high pressure stream of gas that is used to form a floating local mechanical deformation, for example, a depression or dimple, in the flexible glass ribbon near the laser beam. The local mechanical deformation creates a tension field in the flexible glass ribbon that can be used to propagate a crack through a thickness of the flexible glass ribbon perpendicular to broad surfaces of the flexible glass ribbon.

Figure 1:
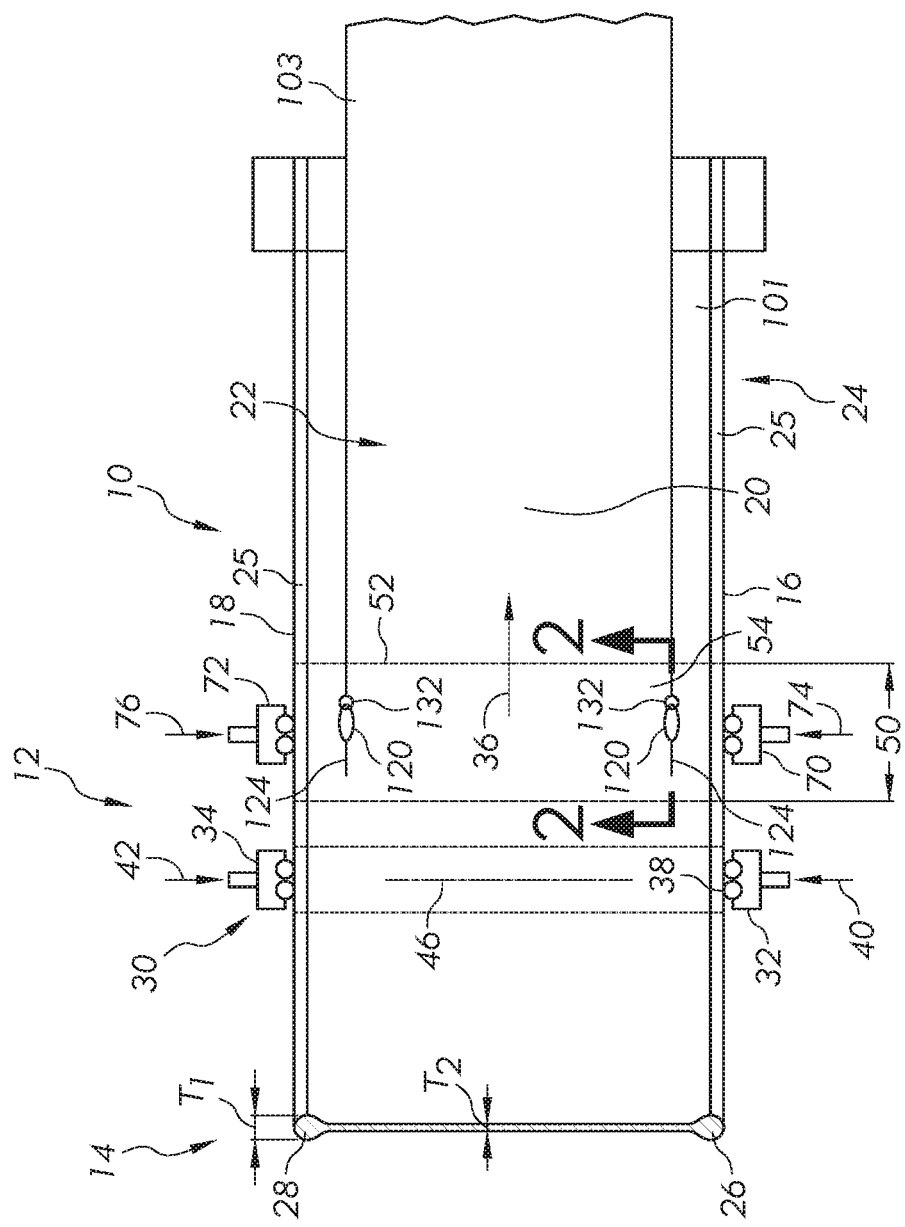
FIG. 1 is a partial view of an embodiment of an apparatus for processing a flexible glass ribbon.

Referring to FIG. 1, a flexible glass ribbon 10 is illustrated being conveyed through a glass processing apparatus 12, only a portion of which is illustrated by FIG. 1. The flexible glass ribbon 10 may be conveyed in a continuous fashion from a glass ribbon source 14 through the glass processing apparatus 12. The flexible glass ribbon 10 includes a pair of opposed first and second edges 16 and 18 that extend along a length of the flexible glass ribbon 10 and a central portion 20 that spans between the first and second edges 16 and 18. In some embodiments, the first and second edges 16 and 18 may be covered in an adhesive tape 25 that is used to protect and shield the first and second edges 16 and 18 from contact. The tape 25 may be applied to one or both of the first and second edges 16 and 18 as the flexible glass ribbon 10 moves through the apparatus 12. In other embodiments, no adhesive tape 25 may be used to cover the first and second edges 16 and 18. A first broad surface 22 and an opposite, second broad surface 24 also spans between the first and second edges 16 and 18, forming part of the central portion 20.

Figure 3:
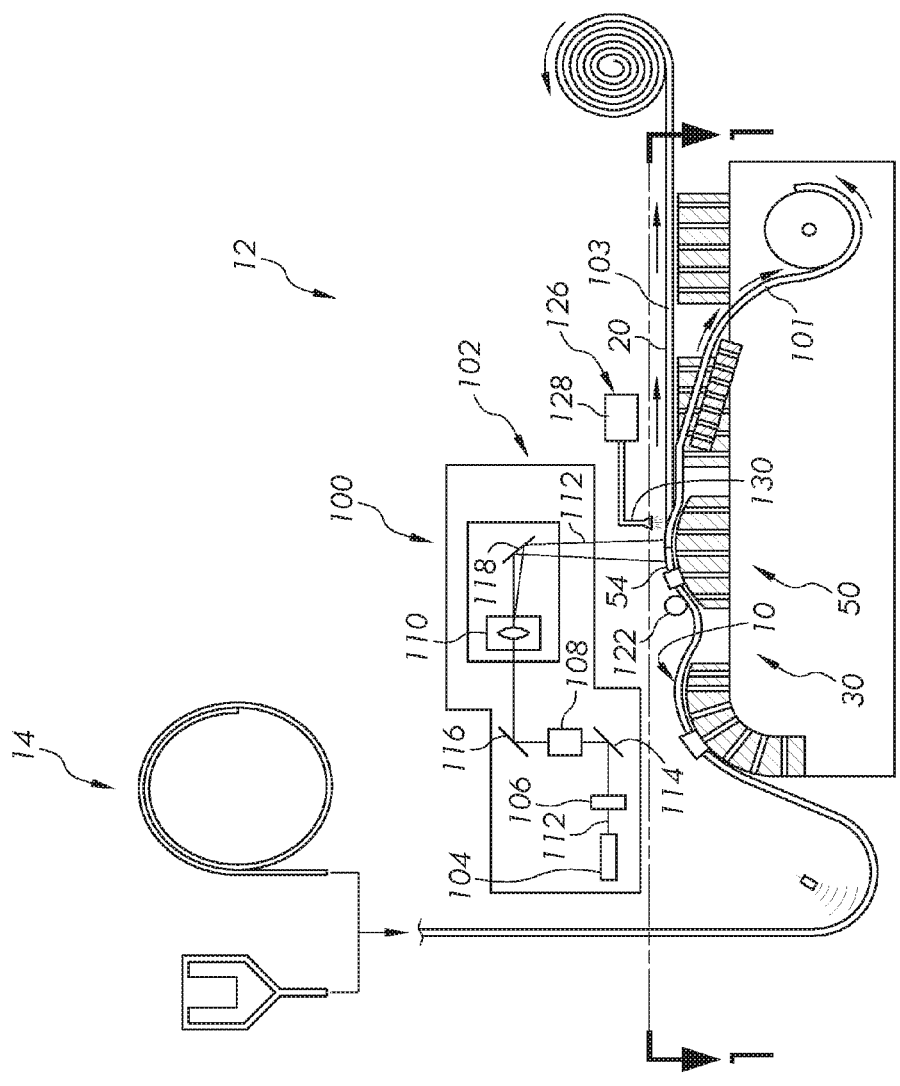
FIG. 3 illustrates a schematic view of an embodiment of an apparatus for processing a flexible glass ribbon.

In embodiments where the flexible glass ribbon 10 is formed using a down draw fusion process, which is shown in part in FIG. 3, the first and second edges 16 and 18 may include beads 26 and 28 with a thickness $T_1$ that is greater than a thickness $T_2$ within the central portion 20. The central portion 20 may be "ultra-thin" having a thickness $T_2$ of about 0.3 mm or less including but not limited to thicknesses of, for example, about 0.01-0.05 mm, about 0.05-0.1 mm, about 0.1-0.15 mm and about 0.15-0.3 mm, 0.3, 0.29, 0.28, 0.27, 0.26, 0.25, 0.24, 0.23, 0.22, 0.21, 0.2, 0.19, 0.18, 0.17, 0.16, 0.15, 0.14, 0.13, 0.12, 0.11, 0.1, 0.09, 0.08, 0.07, 0.06, or 0.05 mm although flexible glass ribbons 10 with other thicknesses may be formed in other examples.

The flexible glass ribbon 10 is conveyed through the apparatus 12 using a conveyor system 30. Lateral guides 32 and 34 may be provided to orient the flexible glass ribbon 10 in the correct lateral position relative to the machine or travel direction 36 of the flexible glass ribbon 10. For example, as schematically shown, the lateral guides 32 and 34 may include rollers 38 that engage the first and second edges 16 and 18. Opposed forces 40 and 42 may be applied to the first and second edges 16 and 18 using the later guides 32 and 34 that help to shift and align the flexible glass ribbon 10 in the desired lateral orientation in the travel direction 36.

As further illustrated, the lateral guides 32 and 34 can engage the first and second edges 16 and 18 on the tape 25 without engaging the central portion 20 of the flexible glass ribbon 10. As such, the pristine or quality surfaces of the opposed first and second broad surfaces 22 and 24 of the central portion 20 of the flexible glass ribbon 10 can be maintained while avoiding undesired scribing, scratching, or other surface contamination that might otherwise occur if the lateral guides 32 and 34 were to engage either of the first and second broad surfaces 22 and 24 of the central portion 20. Moreover, the lateral guides 32 and 34 may engage the flexible glass ribbon 10 as it is being bent about an axis 46 transverse to the travel direction 36 of the flexible glass ribbon 10. Bending the flexible glass ribbon 10 can increase the rigidity of the glass ribbon 10 throughout the bend. As such, the lateral guides 32 and 34 can engage the glass ribbon 10 in bent and substantially planar conditions. The forces 40 and 42 applied by the lateral guides 32 and 34 are less likely to buckle or otherwise disturb the stability of the glass ribbon profile when laterally aligning as the flexible glass ribbon 10 when in a bent condition.

The apparatus 12 can further include a cutting zone 50 downstream from the axis 46. In one example, the apparatus 12 may include a cutting support member 52 configured to bend the flexible glass ribbon 10 in the cutting zone 50 to provide a bent target segment 54 with a bent orientation. Bending the target segment 54 within the cutting zone 50 can help stabilize the flexible glass ribbon 10 during the cutting procedure. Such stabilization can help inhibit buckling or disturbing the flexible glass ribbon profile during the procedure of cutting the flexible glass ribbon 10. In other embodiments, the cutting support member 52 may not bend the flexible glass ribbon 10, instead providing and supporting the flexible glass ribbon 10 in a substantially planar orientation.

The cutting support member 52 can comprise a non-contact cutting support member 52 designed to support the glass ribbon 10 without touching the first and second broad surfaces 22 and 24 of the flexible glass ribbon 10. For example, referring to FIG. 2, the non-contact cutting support member 52 can comprise one or more curved air bars configured to provide a cushion of air to space between the flexible glass ribbon 10 and the cutting support member 52 to prevent the central portion 20 of the flexible glass ribbon 10 from contacting the cutting support member 52. The space can also facilitate the formation of a dimple or local depression in the flexible glass ribbon 10 during a cutting operation, as will be described in greater detail below.

Figure 2:
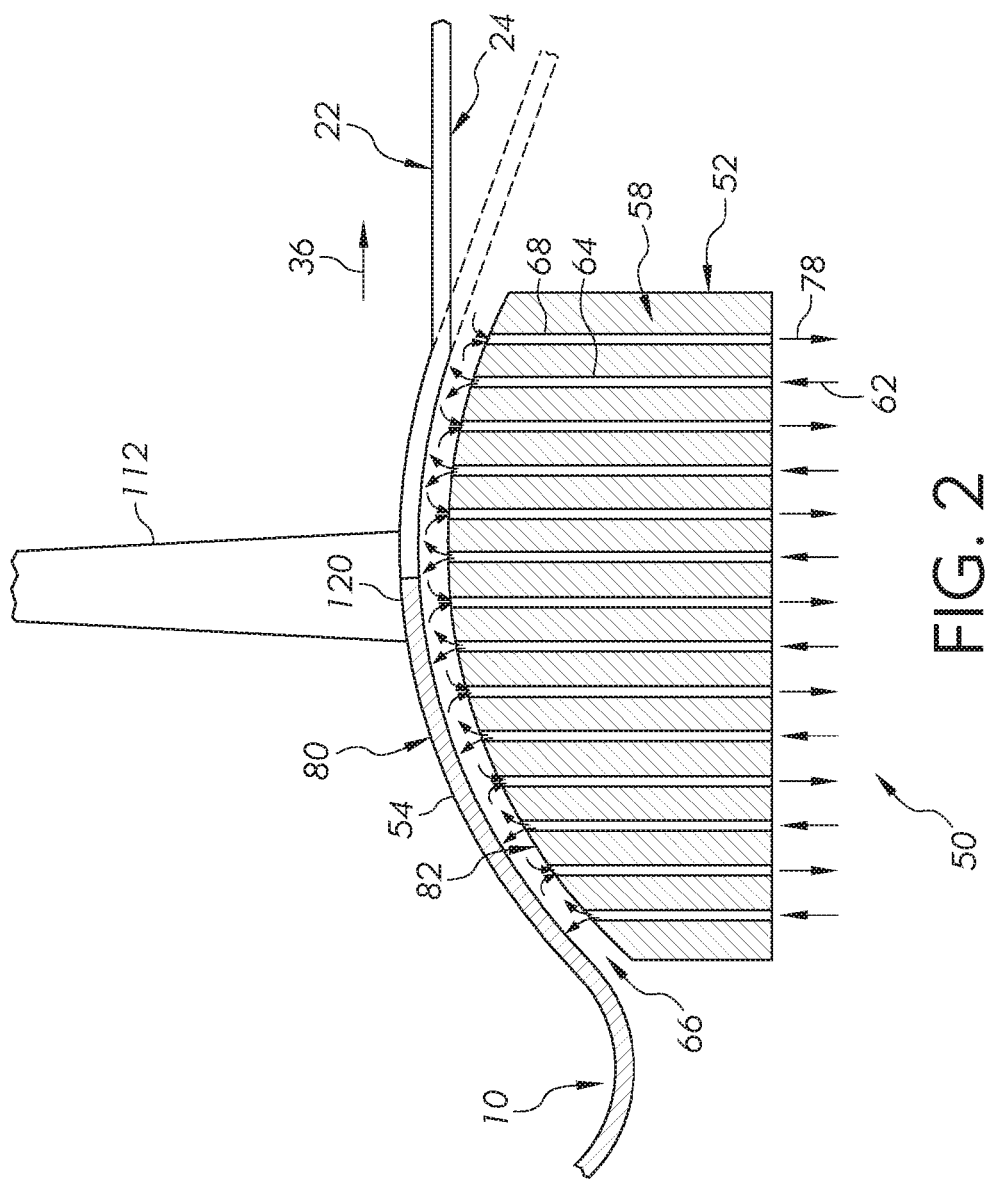
FIG. 2 is a section view along line 2-2 of FIG. 1 illustrating an embodiment of a cutting support member with an upwardly extending convex support surface.

Referring to FIG. 2, the cutting support member 52 can be provided with a plurality of passages 58 configured to provide positive pressure ports 64 such that an air stream 62 can be forced through the positive pressure ports 64 toward the bent target segment 54 to create an air cushion 66 for non-contact support of the bent target segment 54. Optionally, the plurality of passages 58 can include negative pressure ports 68 such that an air stream 78 can be drawn away from the bent target segment 54 to create a suction to partially counteract the force from the air cushion 66 created by the positive pressure ports 64. A combination of positive and negative pressure ports can help stabilize the bent target segment 54 throughout the cutting procedure. Indeed, the positive pressure ports 64 can help maintain a desired air cushion 66 height between the central portion 20 of the flexible glass ribbon 10 and the cutting support member 52. At the same time, the negative pressure ports 68 can help pull the flexible glass ribbon 10 toward the cutting support member 52 to prevent the flexible glass ribbon 10 from undulating or having portions of the bent target segment 54 from floating away from other portions of the target segment 54 when traversing over the cutting support member 52 in the travel direction 36.

Providing the bent target segment 54 in the cutting zone 50 can also increase the rigidity of the flexible glass ribbon 10 throughout the cutting zone 50. As such, as shown in FIG. 1, optional lateral guides 70, 72 can engage the flexible glass ribbon 10 in a bent condition as the flexible glass ribbon 10 passes over the cutting support member 52 within the cutting zone 50. Forces 74 and 76 applied by the lateral guides 70 and 72 are therefore less likely to buckle or otherwise disturb the stability of the glass ribbon profile when laterally aligning as the flexible glass ribbon 10 passes over the cutting support member 52. The optional lateral guides 70 and 72 can therefore be provided to fine tune the bent target segment 54 at the proper lateral orientation along a direction of the axis 46 transverse to the travel direction 36 of the flexible glass ribbon 10.

As set forth above, providing the bent target segment 54 in a bent orientation within the cutting zone 50 can help stabilize the flexible glass ribbon 10 during the cutting procedure. Such stabilization can help prevent buckling or disturbing the glass ribbon profile during the procedure of separating at least one of the first and second edges 16 and 18. Moreover, the bent orientation of the bent target segment 54 can increase the rigidity of the bent target segment 54 to allow optional fine tune adjustment of the lateral orientation of the bent target segment 54. As such, the flexible glass ribbon 10 can be effectively stabilized and properly laterally oriented without contacting the first and second broad surfaces 22 and 24 of the central portion 20 during the procedure of separating at least one of the first and second edges 16 and 18.

Increased stabilization and rigidity of the bent target segment 54 of the flexible glass ribbon 10 can be achieved by bending the target segment 54 to include an upwardly convex surface and/or an upwardly concave surface along a direction of the axis 46. For example, as shown in FIG. 2, the bent target segment 54 includes a bent orientation with an upwardly facing convex surface 80. Examples of the disclosure can involve supporting the bent target segment 54 with an upwardly facing convex support surface 82 of the cutting support member 52, such as the illustrated air bar. Providing the cutting support member 52 with an upwardly facing convex support surface 82 can likewise bend the flexible glass ribbon 10 in the cutting zone 50 to achieve the illustrated bent orientation.

The apparatus 12 can further include a flexible glass cutting apparatus 100 configured to sever portions 101 and 103 of the flexible glass ribbon 10 from one another. In one example, as shown in FIG. 3, the glass cutting apparatus 100 can include an optical delivery apparatus 102 for irradiating and therefore heating (e.g. from an upwardly facing surface) a portion of the bent target segment 54. In one example, optical delivery apparatus 102 can comprise a cutting device such as the illustrated laser 104 although other radiation sources may be provided in further examples. The optical delivery apparatus 102 can further include a circular polarizer 106, a beam expander 108, and a beam shaping apparatus 110.

The optical delivery apparatus 102 may further comprise optical elements for redirecting the beam of radiation (e.g., laser beam 112) from the radiation source (e.g., laser 104), such as mirrors 114, 116 and 118. The radiation source can comprise the illustrated laser 104 configured to emit a laser beam having a wavelength and a power suitable for heating the flexible glass ribbon 10 at a location where the beam is incident on the flexible glass ribbon 10. In one embodiment, laser 104 can comprise a $CO_2$ laser although other laser types may be used in further examples.

The laser 104 may be configured to initially emit the laser beam 112 with a substantially circular cross section. The optical delivery apparatus 102 is operable to transform laser beam 112 such that the beam 112 has a significantly elongated shape when incident on glass ribbon 10. As shown in FIG. 1, the elongated shape can produce an elongated radiation zone 120 that may include the illustrated elliptical footprint although other configurations may be provided in further examples. The elliptical foot print can be positioned on the upwardly facing convex surface of the bent target segment.

The boundary of the elliptical footprint can be determined as the point at which the beam intensity has been reduced to $1/e^2$ of its peak value. The laser beam 112 passes through circular polarizer 106 and is then expanded by passing through beam expander 108. The expanded laser beam 112 then passes through beam shaping apparatus 110 to form a beam producing the elliptical footprint on a surface of the bent target segment 54. The beam shaping apparatus 110 may, for example, comprise one or more cylindrical lenses. However, it should be understood that any optical elements capable of shaping the beam emitted by laser 104 to produce an elliptical footprint on the bent target segment 54 may be used.

The elliptical footprint can include a major axis that is substantially longer than a minor axis. In some embodiments, for example, the major axis is at least about ten times longer than minor axis. However, the length and width of the elongated radiation zone are dependent upon the desired separating speed, desired initial crack size, thickness of the glass ribbon, laser power, etc., and the length and width of the radiation zone may be varied as needed.

As further shown in FIGS. 1 and 3, the exemplary glass cutting apparatus 100 may also include a defect initiation device 122. The defect initiation device 122 can initiate or form a defect on one or both of the first and second broad surfaces 22 and 24 at or near the start of a desired cutting line. In some embodiments, a continuous initiation defect 124 (e.g., a scribe line across an entire or only a portion of a length or width of the flexible glass substrate) may be formed, or one or more discrete initiation defects of limited length may be formed where only one or more portions, for example, an edge (e.g., a leading edge) and/or location(s) spaced from the edge of the flexible glass substrate 10 is scribed or nicked. In some instances, a continuous initiation defect 124 may be desired because the tensile stresses needed to propagate the defect may be lower compared to use of discrete defects only. In some embodiments, the initiation defect may be continuous only until separation of the flexible glass begins. Various methods and tools can be used to form the initiation defect. For example, a scribing wheel, a contacting pin, or other mechanical device having a hard contacting tip made of, e.g., SiC, diamond, and the like, can be used to form the defect such as a scribe line on either or both the first and second broad surfaces 22 and 24 of the flexible glass ribbon 10. Because the overall thickness of the flexible glass substrate 10 may be at most 300 µm, in some instances, a continuous initiation defect through at least a portion of a thickness of the flexible glass substrate 10 can be relatively easily and conveniently formed in the scribing process. In some embodiments, the initiation defect can be created by a laser, for example by ablation, melting, or thermal shock.

Figure 4:
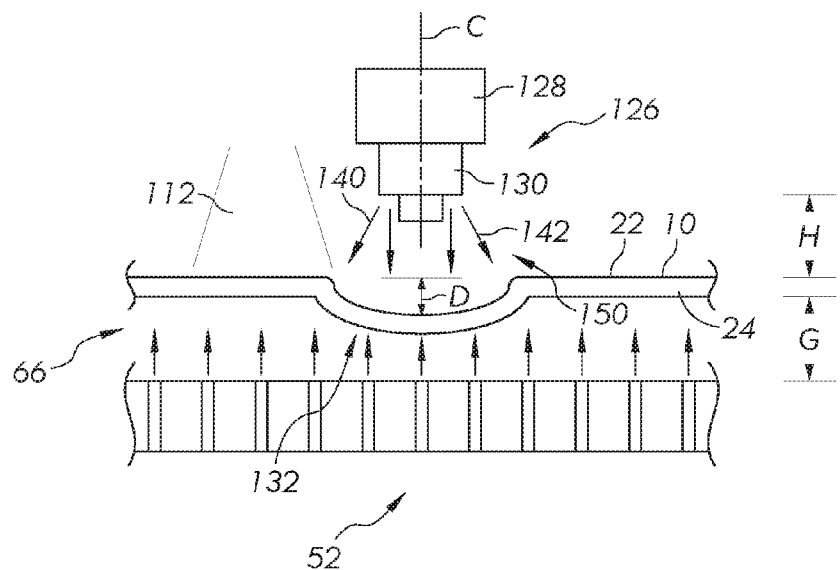
FIG. 4 is a schematic side view of an embodiment of a cutting apparatus including a nozzle and pressurized air forming a local depression in a flexible glass ribbon.

The glass cutting apparatus 100 further includes a pressurized gas delivery device 126. FIG. 4 illustrates a more detailed view of the gas delivery device 126, which includes a compressor or other pressurized gas source 128 that is fluidly connected to a nozzle 130.

As indicted above, the non-contact cutting support member 52 can support the glass ribbon 10 without touching the first and second broad surfaces 22 and 24 of the flexible glass ribbon 10 using air cushion 66. In some embodiments, the second broad surface 24 of the flexible glass ribbon 10 may be maintained a height G of at least about 0.3 mm from the non-contact cutting support member 52, such as in the range of about 0.3 mm to about 1.5 mm, such as about 0.7 mm to about 1.1 mm. Maintaining a height G below the nozzle 130 allows for formation of a dimple or local depression 132 in the flexible glass ribbon 10. The nozzle 130 may be located such that, as shown in FIG. 1, a center of the dimple or local depression 132 is positioned at a downstream location relative to the initiation defect and a middle of a length of the elongated radiation zone 120, so that the initiation defect 124 is formed and the flexible glass ribbon 10 is heated before reaching the dimple or local depression 132.

Figure 5:
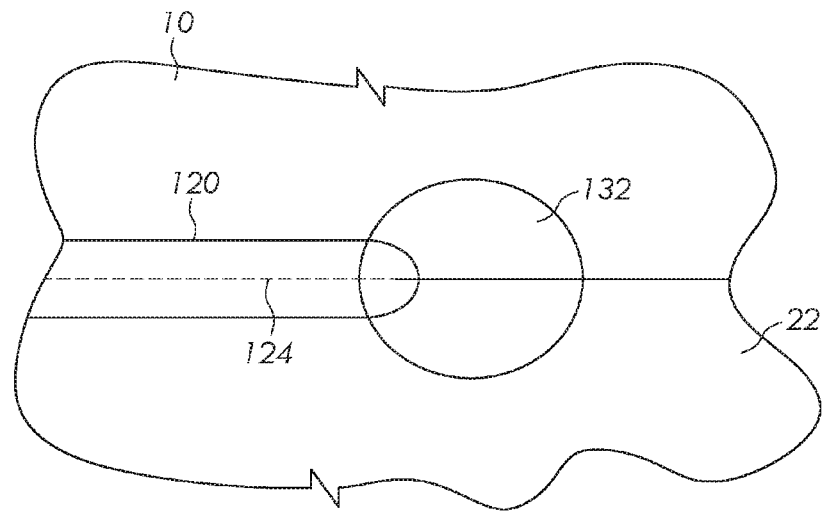
FIG. 5 is a schematic top view of a flexible glass ribbon having a local depression.

Referring also to FIG. 5, the initiation defect 124 is formed as a continuous scribe line extending in the direction of the longitudinal axis of the ribbon and on the first broad surface 22 of the flexible glass ribbon 10 before reaching the elongated radiation zone 120 of the laser beam 112. As can be seen, the elongated radiation zone 120 of the laser beam 112 may be somewhat elongated in shape, having the length extending along the long axis extending in the ribbon's longitudinal direction and the short axis extending in direction across the width of the ribbon. The laser beam 112 is used to heat the flexible glass substrate 10 locally from an initial temperature to a higher temperature. The initial temperature of the flexible glass substrate can depend on the specific process that the flexible glass ribbon 10 is subjected to. For example, in cases where the flexible glass ribbon is formed at the bottom of a draw of a fusion down-draw or slot down-draw process, or a flexible glass ribbon formed from a float process immediately after bath, the initial temperature of the flexible glass ribbon 10 may be relatively high, such as about 400° C. more or less. A lower initial temperature for the flexible glass substrate 10 may be desirable before heating with the laser beam 112, such as no more than about 300° C., such as no more than about 200° C., such as no more than about 100° C., such as no more than about 50° C., such as no more than about 30° C., such as between about 15° C. and about 30° C. In some embodiments, the flexible glass ribbon 10 may be heated locally at the initiation defect 124 at least about 100° C. from the initial temperature, such as at least about 200° C., such as at least about 300° C., such as at least about 400° C.

Figure 6:
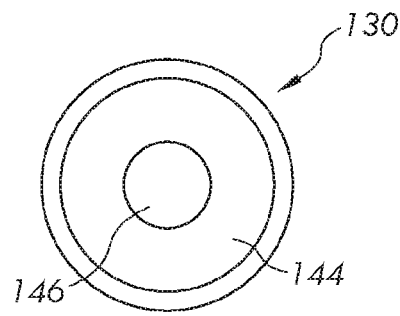
FIG. 6 is a bottom view of an embodiment of a nozzle.

The nozzle 130 (FIG. 4) directs pressurized gas (e.g., air) onto the first surface 22 of the flexible glass ribbon 10, which can provide surface cooling and formation of the local depression 132, both of which can be used to introduce tensile stresses in the flexible glass ribbon 10, wherein the tensile stresses may be present at the initiation defect 124 as it passes by the nozzle 130 as the flexible glass ribbon 10 moves relative thereto. The nozzle 130 may be a divergent flow-type nozzle where at least a portion of the pressurized gas is directed outwardly away from a central axis C of the nozzle 130 (see arrows 140 and 142). Referring briefly to FIG. 6, the nozzle 130 may include an annular air flow passageway 144 and a solid core 146 extending therethrough. Such an arrangement can provide the divergent air flow pattern depicted by FIG. 4 and circular local depression 132 of FIG. 5. The use of a stream 150 of pressurized gas to form the local depression 132 in the flexible glass ribbon 10 at the initiation defect 124 can produce a stable, directed cut in the flexible glass ribbon 10 that is less sensitive to downstream handling vibrations. The stream 150 of pressurized gas creates tensile stresses by cooling and by distending the first and second broad surfaces 22 and 24 of the flexible glass ribbon 10. These surface tensile stresses facilitate crack propagation, even for relatively low thermal expansion glasses. Although not wishing to be bound by theory, the depression causes membrane stress in the flexible glass ribbon, even on the side where the surface of the flexible glass ribbon exhibits concavity (top side as pictured in FIG. 4), as well as on the side where the surface of flexible glass ribbon exhibits convexity.

During cutting, pressure in the nozzle 130 may be maintained at a pressure of between about 20 psi and about 80 psi, such as between about 40 psi and about 65 psi. The nozzle 130 may be maintained at a height H, which can depend on the pressure and desired depth of the local depression 132. Depth D of the local depression 132 may be controlled by the pressure in the nozzle 130, which is counter balanced by the air flow from the non-contact cutting support member 52. The local depression 132 remains stationary, floating or travelling along the length of the flexible glass substrate 10 as the flexible glass substrate 10 moves by the nozzle 130. In some embodiments, the depth D of the local depression 132 may be between about 0.1 mm to about 1 mm. The depth D of the local depression 132 may be controlled by varying or controlling pressure in the nozzle 130, width or diameter of the local depression 132 (between about 3 mm and about 25 mm) and pressure in the non-contact cutting support member 52. As can be seen, the local depression 132 may intersect at least a portion of the elongated radiation zone 120 of the laser beam 112. In other embodiments, the local depression 132. may be located downstream or at least a portion of the local depression 132 may be located downstream of the elongated radiation zone 120 of the laser beam 112. In some embodiments, when the cutting process is initiated by the initial creation of an initiation defect 124, the pressure in the nozzle 130 may be set at 0 psi to minimize the possibility of lateral cracking on the flexible glass ribbon 10 at the initiation point. After the initiation defect 124 is created and heating using the laser beam 112 begins, the pressure in the nozzle 130 may be increased to create the local depression 132.

Figure 7:
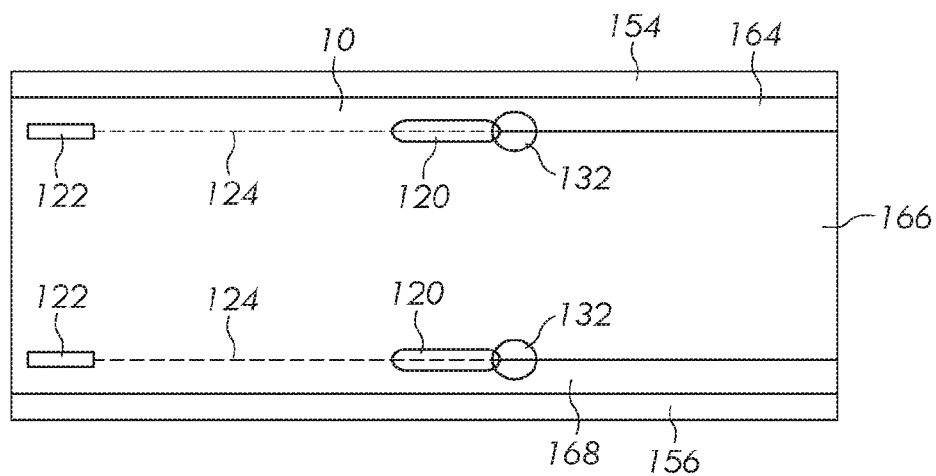
FIG. 7 is a schematic top view of an embodiment of a glass cutting process.
Figure 8:
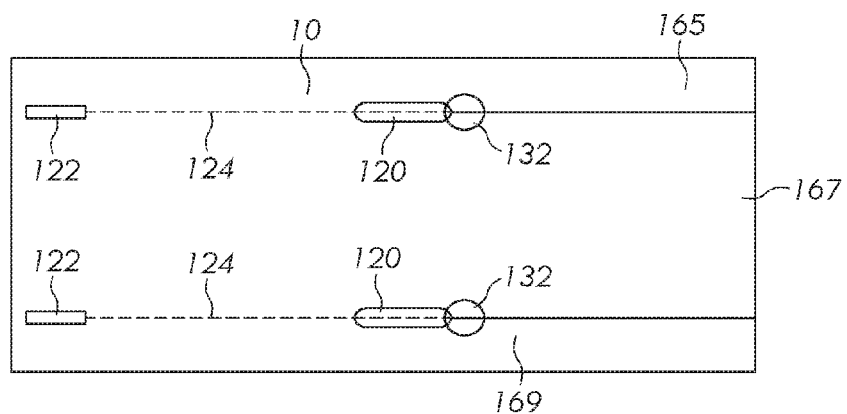
FIG. 8 is a schematic top view of another embodiment of a glass cutting process.
Figure 9:
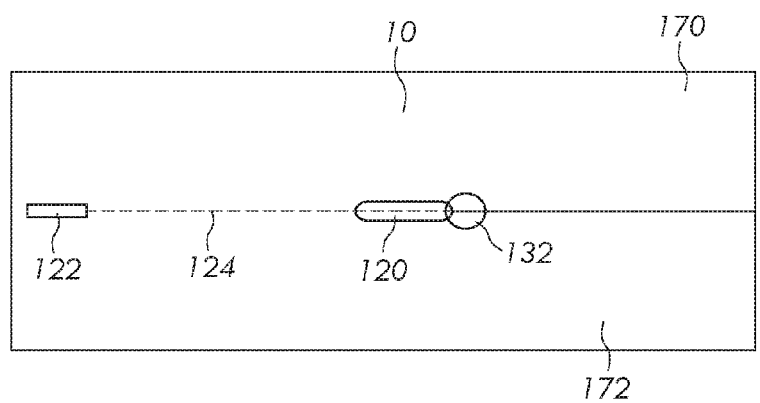
FIG. 9 is a schematic top view of another embodiment of a glass cutting process.
Figure 10:
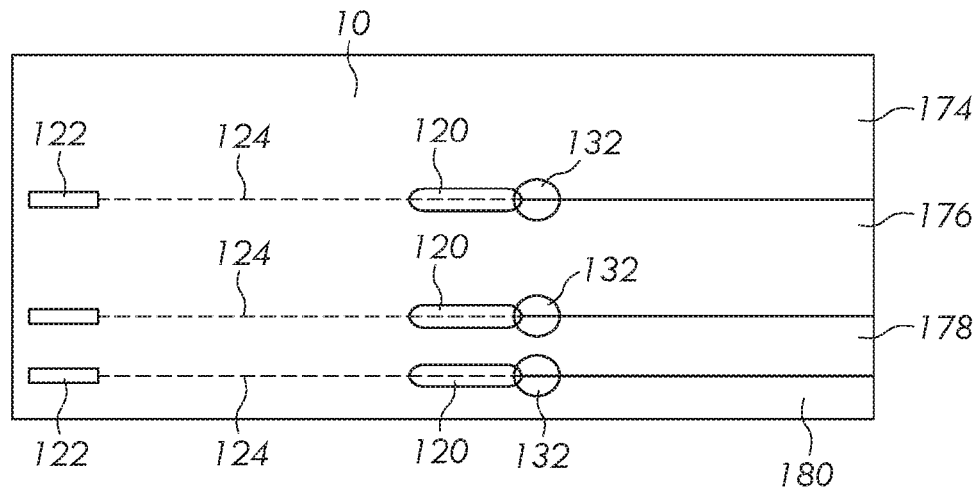
FIG. 10 is a schematic top view of another embodiment of a glass cutting process.
Figure 11:
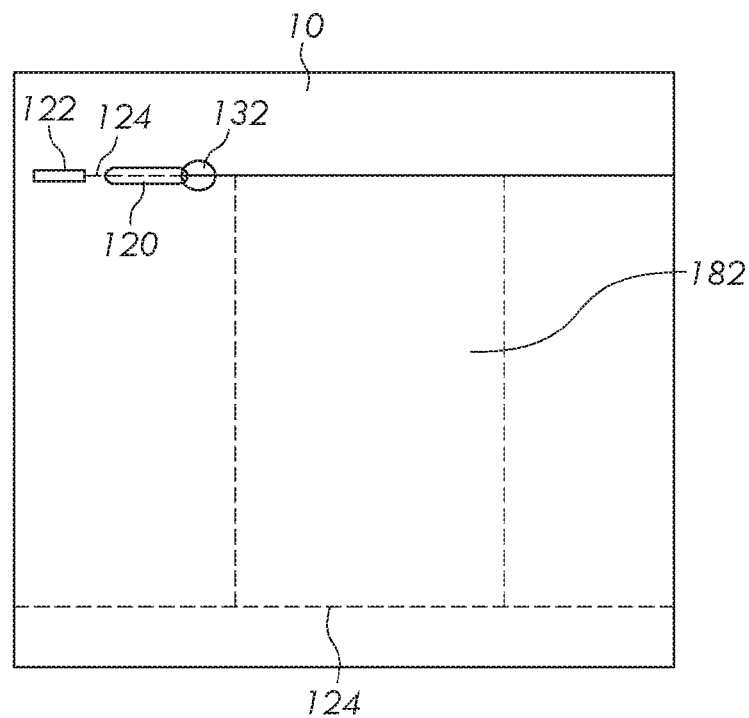
FIG. 11 is a schematic top view of another embodiment of a glass cutting process.

FIGS. 7-11 illustrate various cutting processes for cutting the flexible glass ribbon 10. Referring first to FIG. 7, an edge bead 154 and 156 removal process is illustrated where the glass cutting apparatus 100 including the defect initiation device 122 for making an initiation defect 124, the laser beam 112 and the local depression 132 are used to sever edge regions 164 and 168 of the flexible glass ribbon 10 including the beads 154 and 156 from a central region 166 of the flexible glass ribbon 10. Referring to FIG. 8, a symmetrical glass cutting process is illustrated where the glass cutting apparatus 100 including the defect initiation device 122 for making the initiation defect 124, the laser beam 112 and the local depression 132 are used to slit the flexible glass ribbon 10 into multiple flexible glass webs 165, 167 and 169. FIG. 9 illustrates a glass cutting process where the glass cutting apparatus 100 including the defect initiation device 122 for making the initiation defect 124, the laser beam 112 and the local depression 132 are used to divide the flexible glass substrate 10 into two flexible glass webs 170 and 172 of equal or non-equal widths. Referring to FIG. 10, another glass cutting process is illustrated where multiple sets of the defect initiation device 122 for making the initiation defect 124, the laser beam 112 and local depression 132 are simultaneously used to sever the flexible glass ribbon 10 into multiple (more than two) flexible glass webs 174, 176, 178 and 180 of equal or non-equal widths. Referring to FIG. 11, a glass cutting process is illustrated where the glass cutting apparatus 100 including the defect initiation device 122 for making the initiation defect 124, the laser beam 112 and the local depression 132 are used to sever discrete flexible glass sections 182 from the flexible glass ribbon 10.

The above-described glass cutting apparatus and methods provide a laser-based glass cutting method, which uses the effect of mechanical deformation of the flexible glass ribbon together with the laser beam to create a stress concentration in the flexible glass, wherein the stress concentration propagates an initiation flaw created in the flexible glass to form a crack that is then propagated along a desired cutting line to separate portions of the flexible glass. Propagation of the crack can be provided by the laser heating and the following tension created by air pressure enabling a steady round-shaped tension field in the flexible glass substrate. Such an arrangement can provide consistent continuous propagation of the crack at constant speeds without plane change of the edges of the flexible glass ribbon and without arrest marks and provide propagation of the crack through the glass thickness perpendicular to the broad surfaces of the flexible glass ribbon (rectangular edge shape). Vibration isolation can be provided in order to protect the crack propagation area from external factors originated outside the cutting area and also to mitigate negative effect of internal stress in the flexible glass ribbon. The above-described processes can provide for adjustability for different glass thicknesses. The cutting processes may avoid the use water or air-water mist for quenching after laser heating, which can provide improved edge quality in terms of reduced waviness of the edge, minimization of twist hackle, consistent edge profile (rectangular) over long length of the flexible glass ribbon and over prolonged period of time. The ability to avoid water or air-water mist cooling also leads to a cleaner glass surface. The methods may be applicable to different cutting configurations with one, two or multiple beams and also to discrete glass parts cutting.

In the previous detailed description, for purposes of explanation and not limitation, example embodiments disclosing specific details are set forth to provide a thorough understanding of various principles of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of various principles of the present invention. Finally, wherever applicable, like reference numerals refer to like elements.

For example, although a depression was described above as the local mechanical deformation, a raised area may (for example, in the shape of a dome extending outwardly and upwardly from the surface 22, as direction is shown in the figures) be used instead. Also, although the nozzle and the laser beam were described as acting on the same surface of the glass, they may instead act on opposite surfaces of the glass and the same stress-inducing effect can be achieved. Further, although the local mechanical deformation is shown as a circular, more generally, an oval shape may be used. Other devices (other than gas pressure and nozzles) may be used to form a local deformation in the flexible glass. For example, rollers, or other devices contacting the flexible glass may be used.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used herein, the singular forms "a," "an" and "the" include plural referents unless the context clearly dictates otherwise. Thus, for example, reference to a "component" includes aspects having two or more such components, unless the context clearly indicates otherwise.

It should be emphasized that the above-described embodiments of the present invention, particularly any "preferred" embodiments, are merely possible examples of implementations, merely set forth for a clear understanding of various principles of the invention. Many variations and modifications may be made to the above-described embodiments of the invention without departing substantially from the spirit and various principles of the invention. All such modifications and variations are intended to be included herein within the scope of this disclosure and the following claims.

The invention claimed is:

1. A method for cutting a flexible glass ribbon, the method comprising:
    directing the flexible glass ribbon to a flexible glass cutting apparatus including a laser, the flexible glass ribbon including a first broad surface and a second broad surface that extend between a first edge and a second edge of the flexible glass ribbon;
    directing a laser beam from the laser onto a region of the flexible glass ribbon to form a radiation zone;
    forming a crack through the flexible glass ribbon using the laser beam; and
    propagating the crack along a travel direction of the flexible glass ribbon using the laser beam and a local mechanical deformation in the flexible glass ribbon while the flexible glass ribbon travels in the travel direction relative to the radiation zone and the local mechanical deformation, wherein the local mechanical deformation is formed by directing a pressurized gas onto the flexible glass ribbon, wherein the local mechanical deformation comprises a floating dimple relative to which the flexible glass ribbon travels, and wherein the floating dimple comprises a depression having at least one of a depth of between about 0.1 mm and about 1 mm and a width of between about 3 mm and about 25 mm.

2. The method of claim 1 further comprising forming an initiation defect in the flexible glass ribbon between the first and second edges.

3. The method of claim 2, wherein the floating dimple is formed in the flexible glass ribbon at the initiation defect.

4. The method of claim 1, wherein the floating dimple is at least partially formed in the radiation zone.

5. The method of claim 1, wherein directing the laser beam provides the laser beam incident on the first broad surface at the radiation zone and the floating dimple comprises a depression in the first broad surface.

6. The method of claim 1, wherein the radiation zone comprises an elongated radiation zone including a length that is greater than a width of the elongated radiation zone, and the length of the elongated radiation zone extends along the travel direction.

7. The method of claim 1, wherein propagating the crack along the flexible glass ribbon does not include water quenching or air-water mist quenching of an area of the glass ribbon heated with the laser beam.

8. The method of claim 1, further comprising the step of supporting the flexible glass ribbon with an air cushion for non-contact support of the flexible glass ribbon while propagating the crack.

9. The method of claim 8, wherein the air cushion contacts the second broad surface of the flexible glass ribbon while the second broad surface travels relative to the radiation zone and the floating dimple while propagating the crack.

10. The method of claim 1, wherein the floating dimple comprises a circular depression.

11. A method for cutting a flexible glass ribbon, the method comprising:
    directing the flexible glass ribbon to a flexible glass cutting apparatus including a laser, the flexible glass ribbon including a first broad surface and a second broad surface that extend between a first edge and a second edge of the flexible glass ribbon;
    directing a laser beam from the laser onto a region of the flexible glass ribbon to form a radiation zone;
    forming a crack through the flexible glass ribbon using the laser beam; and
    propagating the crack along a travel direction of the flexible glass ribbon using the laser beam and a local mechanical deformation in the flexible glass ribbon while the flexible glass ribbon travels in the travel direction relative to the radiation zone and the local mechanical deformation, wherein the local mechanical deformation is formed by directing a pressurized gas onto the flexible glass ribbon, and wherein directing the laser beam provides the laser beam incident on the first broad surface at the radiation zone and the local mechanical deformation comprises a depression in the first broad surface, and wherein the depression has at least one of a depth of between about 0.1 mm and about 1 mm and a width of between about 3 mm and about 25 mm.

12. The method of claim 11 further comprising forming an initiation defect in the flexible glass ribbon between the first and second edges.

13. The method of claim 12, wherein the depression is formed in the flexible glass ribbon at the initiation defect.

14. The method of claim 11, wherein the depression is at least partially positioned in the radiation zone.

15. The method of claim 11, wherein the radiation zone comprises an elongated radiation zone including a length that is greater than a width of the elongated radiation zone, and the length of the elongated radiation zone extends along the travel direction.

16. The method of claim 11, wherein propagating the crack along the flexible glass ribbon does not include water quenching or air-water mist quenching of an area of the glass ribbon heated with the laser beam.

17. The method of claim 11, further comprising the step of supporting the flexible glass ribbon with an air cushion for non-contact support of the flexible glass ribbon while propagating the crack.

18. The method of claim 17, wherein the air cushion contacts the second broad surface of the flexible glass ribbon while the second broad surface travels relative to the radiation zone and the depression while propagating the crack.

* * * * *

UNITED STATES PATENT AND TRADEMARK OFFICE
CERTIFICATE OF CORRECTION

PATENT NO. : 9,919,381 B2  
APPLICATION NO. : 14/763614  
DATED : March 20, 2018  
INVENTOR(S) : Anatoli Anatolyevich Abramov et al.

Page 1 of 1

It is certified that error appears in the above-identified patent and that said Letters Patent is hereby corrected as shown below:

On the Title Page

On page 2, Column 2, item (56), other publications, Line 6, delete "CN201480006574.6" and insert -- CN201480006574.8 --, therefor.

Signed and Sealed this  
Twenty-fourth Day of December, 2019

Andrei Iancu  
*Director of the United States Patent and Trademark Office*